United States Patent [19]

Koch

[11] Patent Number: 4,842,234
[45] Date of Patent: Jun. 27, 1989

[54] METHOD AND APPARATUS FOR LINEAR BRAKING AND CHAIR WITH LINEAR BRAKE

[76] Inventor: Roger Koch, 311 NE. 103rd St., Miami Shores, Fla. 33138

[21] Appl. No.: 18,647

[22] Filed: Feb. 25, 1987

[51] Int. Cl.$^4$ .......................................... F16M 13/00
[52] U.S. Cl. .................................... 248/429; 248/424; 248/1 R
[58] Field of Search ............... 248/429, 430, 424, 425, 248/419, 420, 395, 661, DIG. 13, 298; 297/330, 344

[56] References Cited

U.S. PATENT DOCUMENTS

| | | | |
|---|---|---|---|
| 1,806,014 | 5/1931 | Flintermann | 297/344 X |
| 2,758,872 | 8/1956 | Solomon et al. | 297/344 X |
| 3,330,523 | 7/1967 | Nichols | 248/420 X |
| 3,661,352 | 5/1972 | MacFarlane | 248/429 |
| 3,981,473 | 9/1976 | Nagai | 248/430 |
| 4,183,493 | 1/1980 | Keutsky | 248/430 |
| 4,233,740 | 11/1980 | Bunn et al. | 248/DIG. 13 |
| 4,645,159 | 2/1987 | Terada et al. | 248/429 |

Primary Examiner—Alvin C. Chin-Shue
Assistant Examiner—David L. Talbott
Attorney, Agent, or Firm—John Cyril Malloy

[57] ABSTRACT

In one embodiment, the linear brake includes a carriage riding over a threaded rod. A pair of jaws is carried by the carriage and each jaw has a jaw face at one end thereof. The jaw face includes a plurality of spaced jaw recesses that are adapted to mate with the threads on the threaded rod. The fore sections of each jaw face are juxtaposed. Each jaw is adapted to rotate in a plane of engagement. Each jaw has, spaced from the jaw face, a hole normal to the plane of engagement. The carriage includes pivot pins having an outside diameter smaller than the hole such that the jaw recesses move both rotationally and laterally away from the threads on the threaded rod when the brake is released. A spring forces the jaw recesses into the threads on the rod. Counteracting forces, applied by pulling cables, move the jaw faces away from the threads and then partially rotate the faces in the plane of engagement away from the threaded rod thereby allowing linear travel of the carriage along the threaded rod surface. A method for linearly braking the carriage and a chair incorporating the linear brake is also disclosed.

13 Claims, 5 Drawing Sheets

METHOD AND APPARATUS FOR LINEAR BRAKING AND CHAIR WITH LINEAR BRAKE

BACKGROUND OF THE INVENTION

The present invention relates to a method of linearly braking a carriage, a linear brake apparatus and a chair incorporating the linear brake.

Linear brakes are available which prohibit the movement of a carriage traveling in one direction along a rod, bar, elongated member or surface. In some instances, the device normally prohibits movement and when a control signal, particularly a mechanical control signal, is applied to the brake, the brake releases and allows linear movement with respect to a fixed object. The brake may prohibit movement in only one direction along the object or may prohibit movement in two linear directions along the object.

In a specific example, linear brakes are utilized in chairs or seats on commercial aircraft. Particularly, these chairs rotate or swivel about a vertical central axis, move fore and aft along a pair of longitudinal runners, and move side-to-side or laterally along a pair of lateral runners. Typically, braking mechanisms are utilized for the rotational, longitudinal and lateral movements. On commercial aircraft, it is required that the brakes be normally engaged such that the chair does not swivel, nor move fore and aft (longitudinally), or side-to-side (laterally). When a control signal, which is usually a mechanical signal, is applied to the braking mechanism, the chair is enabled to rotate, to move side-to-side and move back and forth. The present invention relates to linearly braking the longitudinal and lateral movements.

One known linear brake is made by P. L. Porter Company. Generally, this brake is a friction type brake mechanism which travels on a smooth rod extending between various components of the chair immediately beneath the bottom cushion of the chair. U.S. Pat. No. 3,874,480 describes, at least in part, the Porter brake. When the chair is utilized in commercial aircraft, the brake must withstand at least a 9 g force without failure pursuant to the Federal Aviation Administration regulations. However, the Porter brake is a heavy component for use in the aircraft, requires significant initial force to free the friction-like grip of the brake from the lateral or longitudinal runners and is relatively noisy when the brake travels over the smooth bar, that is the braking surface. The initial lateral or longitudinal force required to free the brake from the traveling surface is significant as compared with the present invention. This force is not diminished by the mechanical release control signal applied to the brake to release it from the locked position.

OBJECTS OF THE PRESENT INVENTION

It is an object of the present invention to provide a linear brake that is lighter than the Porter linear brake.

It is another object of the present invention to provide a linear brake that emits little or no noise when the brake travels over the braking surface after the brake is released.

It is a further object of the present invention to provide a linear brake which is light weight.

It is a further object of the present invention to provide a linear brake which does not require any significant force to move the brake carriage over the braking surface.

It is another object of the present invention to provide a linear brake which is cheaper to manufacture than the Porter linear brake.

It is another object of the present invention to provide a brake that has minimal actuating force.

SUMMARY OF THE INVENTION

In one embodiment, the linear brake includes a carriage riding over a threaded rod. A pair of jaws is carried by the carriage and each jaw has a jaw face at one end thereof. The jaw face includes a plurality of spaced jaw recesses that are adapted to mate with the threads on the threaded rod. The fore sections of each jaw face are juxtaposed. Each jaw is adapted to rotate in a plane of engagement. Each jaw has, spaced from the jaw face, a hole normal to the plane of engagement. The carriage includes pivot pins having an outside diameter smaller than the holes such that the jaw recesses move both rotationally and laterally away from the threads on the threaded rod when the brake is released. A spring forces the jaw recesses into the threads on the rod. A counteracting force, applied by a pulling cable that transmits the mechanical control signal, moves each jaw face away from the threads and then partially rotates the jaw face in the plane of engagement away from the threaded rod thereby allowing linear travel of the carriage across the threaded rod surface. A method for linearly braking a carriage and a chair incorporating the brake is also disclosed.

BRIEF DESCRIPTION OF THE DRAWINGS

Further objects and advantages of the present invention can be found in the accompanying description of the preferred embodiments when taken in conjunction with the accompanying drawings in which:

FIG. 13 illustrates an oblong hole through the jaw which is remote from the jaw face; and, FIG. 14 is a block diagram utilized to explain a preferred embodiment of the present invention.

DETAILED DESCRIPTION OF THE PREFERRED EMBODIMENTS

The present invention relates to a linear braking method, to a linear brake, and to a chair incorporating the linear brakes.

Figure 1:
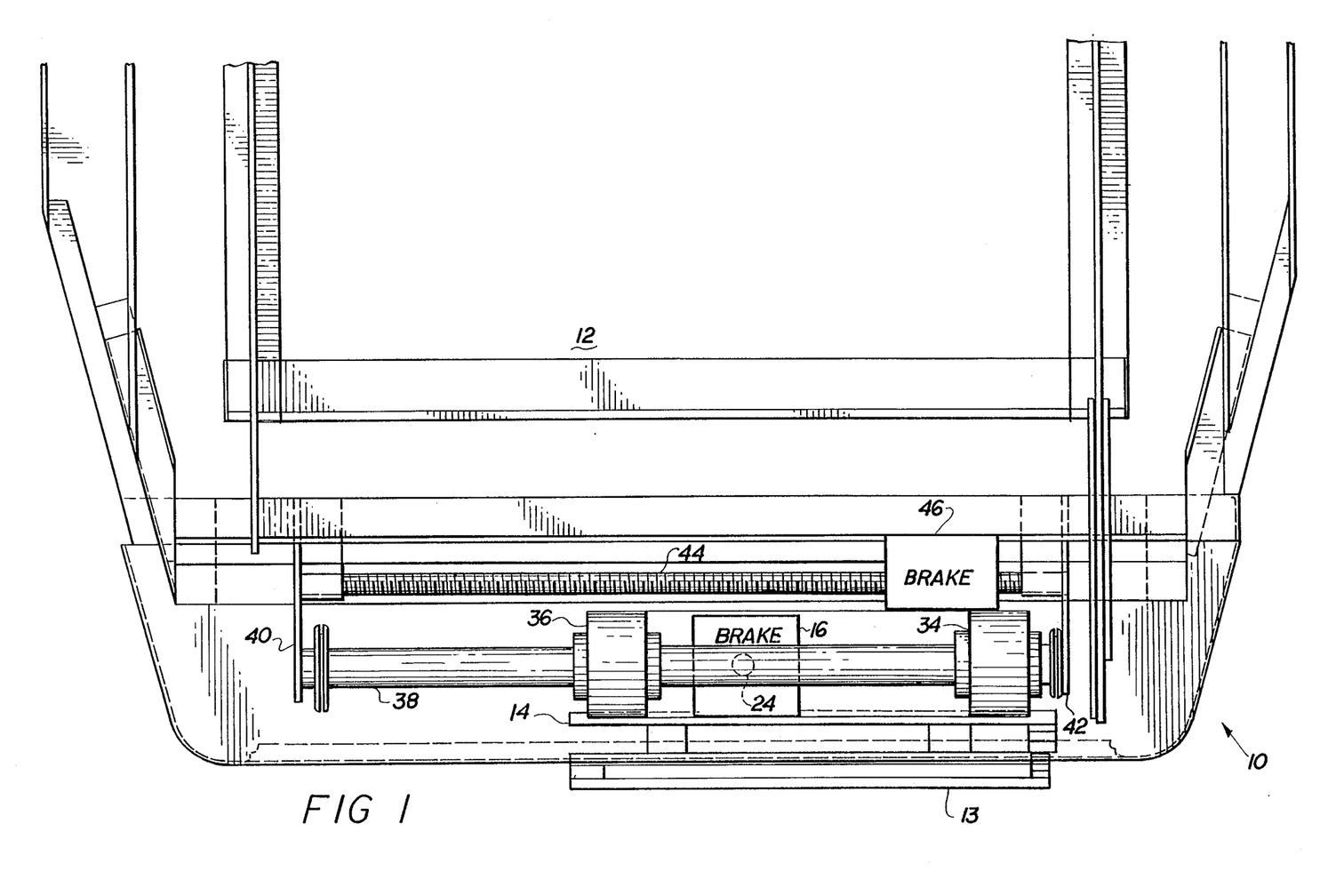
FIG. 1 is a front, plan view of the chair and the lateral and longitudinal braking assemblies.
Figure 2:
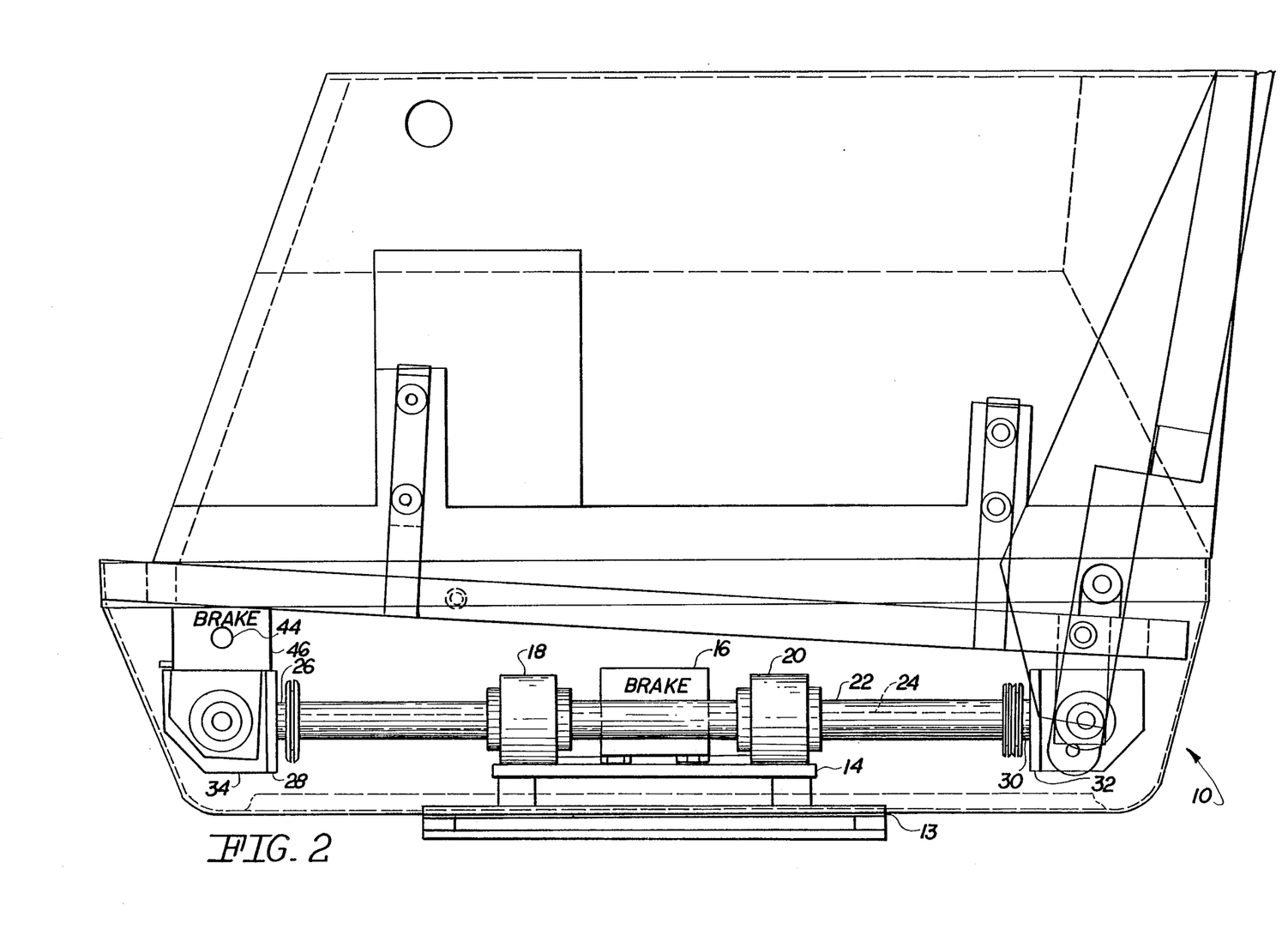
FIG. 2 is a side, plan view of the chair and the longitudinal and lateral braking assemblies.

FIG. 1 illustrates a front, plan view of a chair 10. Region 12 of the chair is where a seat cushion is placed. Chair 10 includes base 13 which sits on a rotational platform not shown in the figures. A base platform 14 is mounted to base 13. A longitudinal, linear brake assembly 16 is mounted to platform 14. As best shown in FIG. 2, where like numerals designate like items, a pair of longitudinal bearings 18 and 20 are also attached to platform 14. Longitudinal running rod 22 passes through bearings 18 and 20. In this embodiment, a threaded braking rod 24 extends through brake 16.

The fore end 26 of longitudinal running rod 22 is attached to a front frame piece 28 of a longitudinally movable frame. The aft end 30 of running rod 22 is attached to rear frame piece 32. Threaded braking rod 24 is also attached to frame piece 28 and frame piece 32.

Lateral bearings 34 and 36, best illustrated in FIG. 1, are also attached to front frame piece 28. Lateral running rod 38 is attached to seat frame member 40, on the left side of chair 10 in FIG. 1 and is attached to seat frame member 42 on the right side of chair 10. A lateral, threaded braking rod 44 is also attached to seat frame member 40 and seat frame member 42. Threaded braking rod 44 extends through lateral brake assembly 46. Brake assembly 46 is attached atop bearing 34 in this embodiment.

Like numbers identify similar items throughout all the figures.

Figure 3:
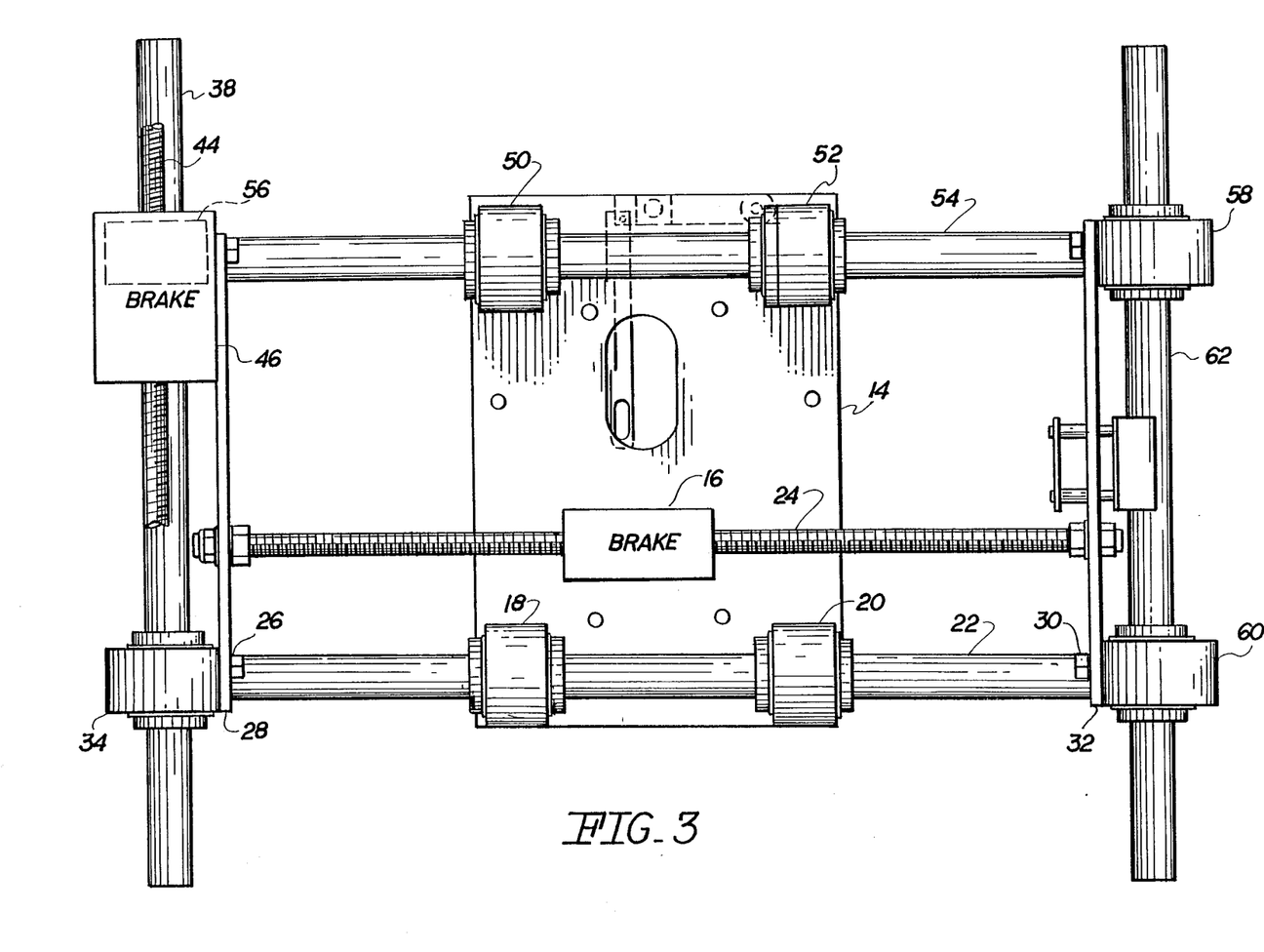
FIG. 3 is a top, plan view of the two braking assemblies showing the frame that permits longitudinal and lateral movement.
Figures 4, 5, 6:
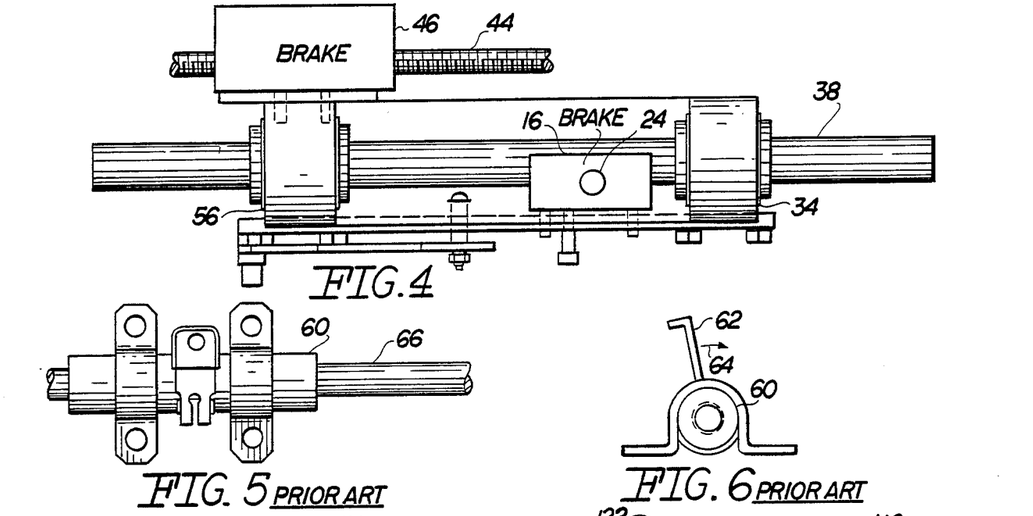
FIG. 4 is a front, plan view of the frame and the two braking assemblies.
FIG. 5 is a top view of a prior art linear braking assembly.
FIG. 6 is a front, axial end view of the prior art braking assembly.

FIG. 3 illustrates a top plan view of the two brake assemblies and the longitudinally movable frame and FIG. 4 illustrates a front, plan view of the brake assemblies and the frame.

As shown in FIG. 3, platform 14 has attached thereto bearings 18, 20, 50, and 52 through which extend longitudinal running rods 22 and 54. Running rods 52 and 54 are attached at that their fore and aft ends to frame pieces 28 and 32. In operation, when brake 16 is released, the chair, which is above the movable frame, is adapted to move front and back or, as described herein, longitudinally.

Mounted to front frame piece 28 is bearing 34 and a second bearing 56. Lateral running rod 38 extends through these two bearings. In FIGS. 3 and 4, lateral brake assembly 46 is mounted atop bearing 56. Threaded braking rod 44 also extends through brake assembly 46. At the rear side or aft side of the frame, attached to frame piece 32 is a pair of lateral bearings 58 and 60 through which extend lateral running rod 62. Since running rods 38 and 62 are attached to the left and right side seat frame members 40 and 42 (see FIG. 1) and since threaded braking rod 44 is also attached to those seat frame members, when brake 46 is released, the chair is adapted to move laterally or side-to-side with respect to the frame. Therefore, when both brakes 46 and 16 are released, the chair can be moved both longitudinally (fore and aft) and laterally (side-to-side).

FIG. 4 shows a front, plan view of the frame showing brake 46, brake 16, threaded brake rods 44 and 24, bearings 56 and 34, and lateral running rod 38.

FIGS. 5 and 6 illustrate the Porter brake which is described at least in part by U.S. Pat. No. 3,874,480 that is corporated herein by reference thereto. Porter brake 60 is a friction brake that is actuated when lever 62 moves in the arcuate direction shown by arrow 64. Brake 60 has smooth rod 66 running therethrough. As described earlier, even after lever 62 is moved in direction 64, a significant force in either axial direction with respect to smooth rod 66 is required to enable brake 60, and the carriage that is attached to the brake, to move along smooth rod 66. After the initial movement of brake 60, the force required to move the brake and carriage along the rod is significantly reduced. Further, when brake 60 moves along smooth rod 66, the brake emits a squeaking noise. Brake 60 is also relatively heavy as compared to the present invention that is shown in detail in FIG. 7.

Figures 7, 8A, 8B, 9, 10, 11:
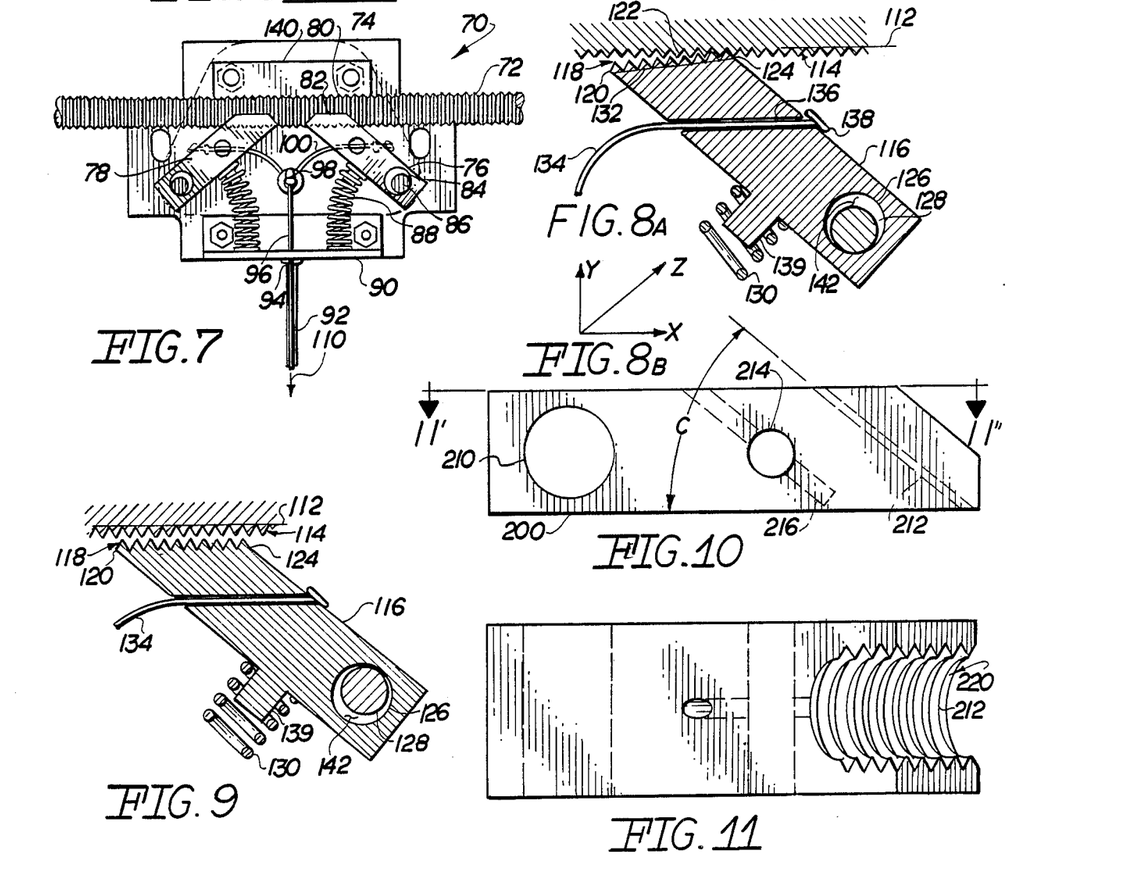
FIG. 7 illustrates a plan view of the linear brake in accordance with the principles of the present invention.
FIG. 8A illustrates a plan view of a jaw in accordance with the principles of the present invention.
FIG. 8B is a coordinate system referenced during the discussion of the jaw illustrated in FIG. 8A.
FIG. 9 illustrates the jaw disengaged in accordance with the principles of the present invention.
FIG. 10 is a plan view of one production stage of the jaw.
FIG. 11 illustrates a view of the jaw from a perspective of section lines 11'-11" in FIG. 10.

FIG. 7 illustrates a brake assembly 70. Brake assembly 70 travels axially with respect to threaded rod 72. The brake assembly includes a carriage that is defined in part by a base plate 74 and a top plate which is placed over other illustrated components of the brake assembly but is not illustrated herein. Brake assembly 70 includes, in this embodiment, two jaws 76 and 78. Each jaw is substantially similar therefore, jaw 76 will be described in detail. At end 80 of jaw 76, an arcuate jaw face 82 has spaced jaw recesses adapted to mate with the threads on threaded rod 72. In other words in one embodiment, threaded rod 72 is a ⅜ inch rod with 24 standard threads per inch. Jaw face 82 spans an arcuate segment of rod 72. Jaw face 82 has a plurality of spaced jaw recesses that match the standard threads on rod 72.

Near the other end of jaw 76 is a hole 84. Jaw 76 is pivotally mounted in the carriage by a pivot pin 86 that is affixed at one end to base plate 74 and is affixed at the other end to the upper plate not shown in FIG. 7. Pivot pin 86 is smaller than hole 84 thereby allowing jaw 76 to move both rotationally with respect to rod 72 as well as laterally or away from the threads on rod 72. This feature will be described in detail later. A compressible spring 88 forces jaw face 82 against threaded rod 72. One end of spring 88 is mounted to front plate 90 of the carriage. The other end of spring 88 is mounted to jaw 76 at a point intermediate the jaw section defining hole 84 and jaw face 82. Load bearing member 140 restricts movement of the rod away from the jaw faces, i.e., pinches the braking surface within the carriage. In this embodiment the surface of member 140 proximate the rod is flat. A cable shield 92 is attached at its proximal end 94 to front plate 90 of the carriage. Cable wire 96, that runs through shield 92, is bifurcated at point 98 and cable segment 100 is affixed to jaw 76 in such a manner as to counteract the biasing force of spring 88 when cable 96 is pulled.

In operation, cable wire 96 is moved in the direction as shown by arrow 110, cable wire segment 100 begins to move jaw 76 both rotationally and laterally away from rod 72 respectively due to the pivot and to the interspace between pivot pin 86 and hole 84.

FIG. 8A is a plan view of a jaw and a surface having a plurality of spaced recesses thereon. Surface 112 includes a plurality of spaced recesses 114. Jaw 116 includes a matching set of spaced jaw recesses 118. As shown in FIG. 8A, jaw 116 prevents linear movement of surface 112 in the positive x direction as shown in the coordinate system of FIG. 8B. In other words, this is movement from fore end 120 of jaw face 122 to aft end 124. Jaw 116 includes hole 126 that is both laterally spaced (along the negative y axis) away from surface 112 as well as longitudinally spaced (along the x axis) from the surface. The longitudinal direction is referenced to the longitudinal aspect of surface 112 or the axial aspect of rod 72 in FIG. 7.

Hole 126 is larger than pivot 128 such that both rotational movement of jaw 116 is provided for as well as lateral movement in the negative y direction away from surface 112 and particularly away from surface recesses 114. Spring 130 biases jaw 116 towards surface 112 and engages the jaw recesses with a portion of surface recesses 114. More specifically, the aft section jaw recesses are engaged with a small section of surface recesses 114. In contrast, the fore section of jaw recesses near fore end 120 are not engaged. This is due to a small angular offset between surface 112 and jaw face surface 132. In other words, a plane normal to the drawing through like points on surface recesses 114 is angularly offset as compared with a plane normal to the drawing through like points on jaw recesses 118.

Cable 134 extends through passage 136 and is attached to jaw 116 by a solder and crimp 138. Spring 130 is mounted to jaw 116 by spring stop 139. In FIG. 8A, the plane of the drawing is a plane of engagement for jaw recesses 118 and surface recesses 114. It should be noted that surface 112 may extend normal to the plane of the drawing and surface recesses 114 may extend over a two dimensional surface region extending along the x and z axes on surface 112. In that situation, jaw face 122 is substantially planar and jaw recesses 118 would generally engage a certain number of surface recesses 114. Jaw 116 operates in the same manner as jaw 76 in FIG. 7 since the drawing shows a plane of engagement coextensive with the rotational movements of both jaws.

Interspace 142 is present between the outside diameter of pivot 128 and hole 126. When cable 134 is pulled, a force is imparted in the negative y direction and in the negative x direction. This causes jaw 116 to partially move in the negative y direction (laterally) as well as rotate along a plurality of pivot points on pivot 128. Movement in the negative y direction causes the aft section jaw recesses near aft end 124 to disengage from surface recesses 114 thereby allowing the rotational movement of jaw 116.

FIG. 9 illustrates such disengagement. It should be noted that the brake shown in FIGS. 8A and 9 prevents movement of the entire brake assembly in the negative x direction with respect to a stationary surface 112. However, this brake assembly permits movement of the brake in the positive x direction with respect to stationary surface 112 due to the ratchet effect of the aft section jaw recesses.

As shown in FIG. 9, interspace 142 moves due to the rotation of the jaw along multiple pivot points on pivot pin 128 by the surface defining hole 126.

FIG. 7 illustrates a linear brake which prohibits movement in either direction along the axis of rod 72. It should be noted that brake assembly 70 in FIG. 7 includes a load bearing element 140, which in this embodiment is an aluminum block, that insures that the section of rod 72 between jaws 78 and 76 does not bend. Dual braking of the brake carriage in FIG. 7 is due to the fore sections of each jaw being juxtaposed.

Figure 12:
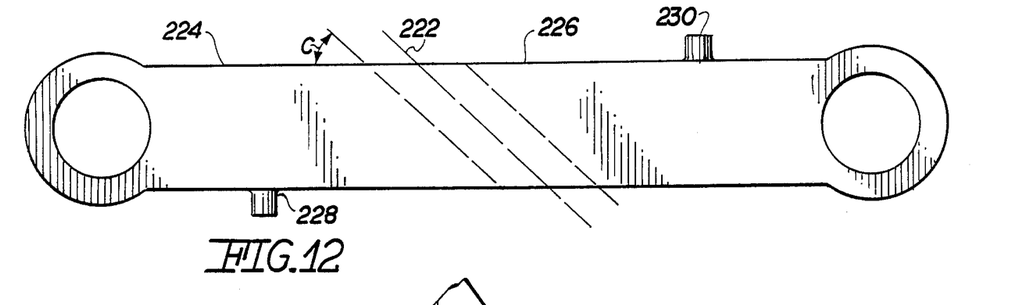
FIG. 12 illustrates a production stage of the jaw.

FIGS. 10, 11 and 12 illustrate the various production stages of the jaws. FIG. 10 shows jaw 200 with hole 210 near one end of the jaw and arcuate jaw face 212 at the other end of the jaw. Hole 214 enables a pin to grip a cable that extends through passage 216. The angle C from the remote side of jaw 200 to the midsectional line of jaw face 212 is approximately 40 degrees. FIG. 11 shows arcuate jaw face 212 having a plurality of jaw recesses 220 from the perspective of section lines 11'—11" in FIG. 10.

FIG. 12 shows a production stage of two jaws that are made from an integral piece of material. The piece is cut along center line 222. Jaws 224 and 226 are made from the piece. Spring stops 228 and 230 hold one end of the compressible springs. The angle spanning arc C is the angle shown in FIG. 10.

Figures 13, 14:
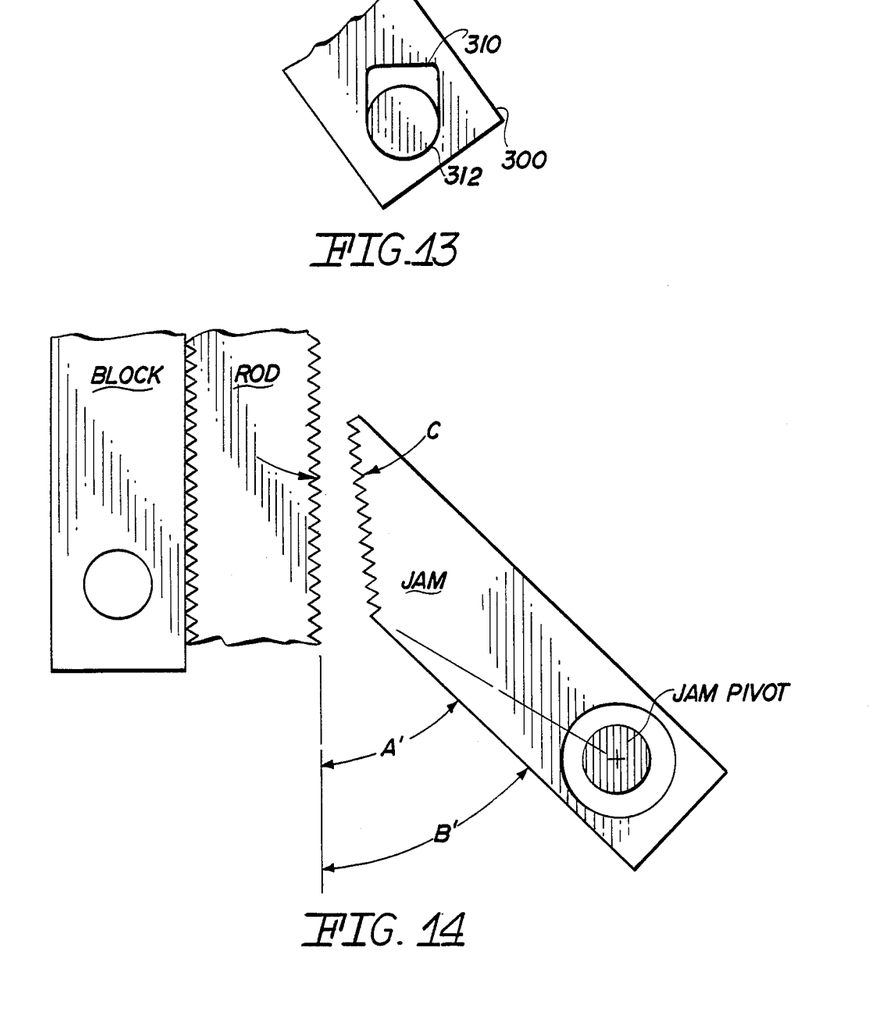

FIG. 13 shows a remote section of jaw 300 having an oblong hole or slot 310 and pivot pin 312 placed through hole 310.

FIG. 14 shows a block diagram of the jaw, threaded rod and backing block in order to describe the preferred embodiments of the present invention. Assuming a trapezoidal jaw, angle A' may range from 20 to 80 degrees, with an optimum range of about 30 to 40 degrees. When angle B' is greater than 30 degrees, clearance is required between the rod threads and jaw threads for the jaw to swing away from the rod. This may be accomplished by any of the following methods:

a. increased clearance at jaw pivot; or
b. angle C' greater than 0 degrees.

Thread size may be any standard thread, with finer threads requiring less clearance at the jaw pivot and thus providing a tighter mechanism in the locked position.

The following dimensions and angles are utilized in one working embodiment:
Angle A: 40 degrees
Angle B: 51 degrees
Angle C: −3 degrees
Minimum Thread Clearance between rod threads and jaw threads: 0.013"
Thread size: ⅜-24 UNF The negative C' angle was found to operate better than a positive C' angle although estimates of an optimum design are inconclusive.

The claims appended hereto are meant to cover modifications and changes within the scope and spirit of the present invention. For example, the hole may be a round, oblong or slot-like hole that enables the jaw to move both laterally away from the surface recesses as well as simultaneously rotate the jaw with respect to the braking surface. One-way braking is provided by a single jaw and two-way linear braking is provided by a pair of jaws with their fore end, jaw face sections juxtaposed. It is also possible to utilize non-uniformly spaced recesses as long as an adequate engagement can be maintained between the surface recesses as well as the jaw face recesses. Each cable may be independently operated to release one of a pair of jaws. The spring and cable may be mounted on the other side of hole 84, opposite the jaw face in FIG. 7, as long as the jaw face itself is biased towards the surface recesses by the spring and as long as the cable acts against the biasing force.

The present brake mechanism is lighter than the Porter brake because aluminum components are utilized. In one embodiment, 357 aluminum alloy is utilized for the jaws and the jaws are heated treated to T6 MIL-H-6088. In use, the present inventive braking mechanism is much quieter than the prior art Porter brake when the brake travels over the threaded rod. Also, there is no initial axial force required to free the brake carriage from a locked position on the brake rod. Further, since aluminum material is used for the brake, the brake is lighter than the Porter brake. Also, the components of the present braking mechanism can be cast or stamped from metal and hence the brake is much cheaper to manufacture than the Porter brake. The present brake has been tested such that the braking force exceeds the 9 g force required by Federal Aviation Administration regulations. The interspace between the pivot and the hole through the jaw is an essential item of the present invention since the jaw recesses must first be moved away from the surface recesses and then the jaw must be rotated with respect to the surface. The claims appended hereto are meant to cover these and other changes and modifications within the scope and spirit of the present invention.

What I claim is:

1. A linear brake for a carriage riding over a surface of an elongated member and having a plurality of spaced surface recesses thereon, said brake comprising:
   a. two jaws each independently operable and each including a fore end and an aft end, said fore end of one jaw being juxtaposed next to a fore end of the other jaw such that braking occurs in both linear directions over said surface;
   b. each jaw having an arcuate jaw face at one end thereof in substantially corresponding to an arcuate configuration of said surface, said jaw face including a plurality of matching spaced jaw recesses formed transversely of said jaw face and extending along the length thereof between a fore end of said jaw face and an aft end of such jaw face and adapted to mate with a portion of said surface recesses in at least one plane of engagement,
   c. each jaw having a hole therethrough being both laterally and longitudinally spaced from said jaw face with respect to the longitudinal axis of the elongated member and normal to said plane of engagement;
   d. a carriage means for carrying each of said jaws, said carriage means having a pivot means for movement of the jaw thereabout and comprising two pivot pins, each pivot pin extending through a different one of said corresponding holes of said respective jaws, each pivot pin being smaller than a respective one of said holes through which it extends thereby allowing for rotational movement and lateral movement away from said surface recesses in said plane of engagement;
   e. biasing means acting on each of said jaws to rotate said respective jaw face into inter-engagement with said portion of said surface recesses, said biasing means comprising two independent biasing members mounted on said carriage and disposed in biasing engagement with separate ones of said jaws; said biasing member cooperatively disposed with said respective jaws such that said fore end of each arcuate jaw face are substantially disengaged from said arcuate surface and said aft end of each jaw face are biased into engagement with said arcuate surface;
   f. a controllable counter-acting force means secured to each of said jaws for movement thereof substantially against the biasing force of said biasing members and away from said portion of surface recesses and further serves to partially rotate said jaws in said plane of engagement;
   g. said controllable counter-acting force means comprising a bifurcated cable disposed in a cable shield with one cable section of said cable attached to a respective jaw and extending through an elongated receiving channel formed in said jaw and disposed between said jaw face and said hole of each jaw in substantially transverse orientation to the longitudinal axis of said jaw, the proximal end of said cable shield attached to said carriage such that movement of a distal end of said bifurcated cable with respect to said cable shield causes movement of said pair of jaws relative to said biasing force and into and out of engagement with said surface of said elongated member.

2. A linear brake as claimed in claim 1 including a means, as part of said carriage means, for limiting movement of said pivot means away from said surface.

3. A linear brake as claimed in claim 1 wherein a jaw face plane, normal to said plane of engagement and intersecting like points on said jaw face, is angularly oriented at a predetermined angle with respect to a surface recess plane, normal to said plane of engagement and intersecting like points in said surface recesses.

4. A linear brake as claimed in claim 3 wherein said hole is oblong shaped.

5. A linear brake as claimed in claim 3 wherein said hole is round.

6. A linear brake as claimed in claim 1 including a load bearing member on the opposite side of said elongated member with respect to said pair of jaws, said load bearing member mounted onto said carriage.

7. A linear brake as claimed in claim 1 wherein said biasing members are compressible springs, said carriage including a frontal plate extending through said plane of engagement, one end of each spring attached to said frontal plate and the other end of each spring coupled to a respective jaw intermediate the corresponding jaw face and a jaw section adjacent said hole.

8. A linear brake as claimed in claim 1 wherein each jaw has a jaw face plane, normal to said plane of engagement and intersecting like points on the corresponding jaw face, angularly disposed at a predetermined angle with respect to a surface recess plane, normal to said plane of engagement and intersecting like points in said surface recesses.

9. A linear brake as claimed in claim 8 wherein the vertex of the predetermined angles are proximate the fore end sections of respective jaw faces.

10. A linear brake as claimed in claim 1 wherein a predetermined angle is present between a first line extending through the axis of said pin and a midpoint on the jaw face and second line extending through the axis of the hole and said midpoint on the jaw face.

11. A linear brake as claimed in claim 1 wherein said elongated member is a threaded rod, the threads on said rod defining said surface recesses.

12. A linear brake as claimed in claim 11 wherein said jaw faces are arcuate segments that span a circumferential segment of said rod, and said jaw recesses mate with thread portions on said rod about an arcuate engagement region, each said jaw is an elongated jaw having the arcuate jaw face at one end thereof, the longitudinal axes of said elongated jaws being coextensive with said plane of engagement.

13. A chair adapted to move laterally and longitudinally and incorporating a linear brake mechanism, the chair and brake combination comprising:
   a. a base having mounted to a first linear brake mechanism;
   b. a movable frame including two opposing sides, a pair of longitudinal runners extending between said sides and movably mounted to said base, a first elongated member extending through said first brake mechanism and mounted to said sides, and a second linear brake mechanism attached to said frame;

c. a seating means including, at the bottom thereof, a pair of lateral runners movably mounted to said frame, a second elongated member extending through said second brake mechanism and attached to lateral sides of said seating means;

d. said first and second elongated members having a surface forming a plurality of spaced surface recesses;

e. each of said linear brake mechanisms including:

f. two jaws each independently operable and each including a fore end and an aft end, said fore end of one jaw being juxtaposed next to a fore end of the other jaw such that braking occurs in both linear directions over said surface, g. each jaw having an arcuate jaw face at one end thereof in substantially corresponding to an arcuate configuration of said surface, said jaw face including a plurality of matching spaced jaw recesses formed transversely of said jaw face and extending along the length thereof between a fore end and an aft end and adapted to mate with a portion of said surface recesses in at least one plane of engagement, each jaw having a hole therethrough being both laterally and longitudinally spaced from said jaw face with respect to the longitudinal axis of the elongated member and normal to said plane of engagement;

h. a carriage means for carrying each of said jaws, said carriage means having a pivot means comprising two pivot pins, each pivot pin extending through a different one of said corresponding hole of said respective jaws, each pivot pin being smaller than a respective one of said holes through which it extends thereby allowing for rotational movement and lateral movement away from said surface recesses in said plane of engagement;

i. biasing means acting on each of said jaws to rotate said respective jaw face into inter-engagement with said portion of said surface recesses, said biasing means comprising two independent biasing members mounted on said carriage and disposed in biasing engagement with separate ones of said jaws; said biasing member cooperatively disposed with said respective jaws such that said fore sections of each arcuate jaw face are substantially disengaged from said arcuate surface and said aft sections of each jaw are biased in engagement with said arcuate surface, j. a controllable counter-acting force means secured to each of said jaws for movement thereof substantially against the biasing force of said biasing members and away from said portion of surface recesses and further serves to partially rotate said jaws in said plane of engagement;

k. said controllable counter-acting force means comprising a bifurcated cable disposed in a cable shield with one cable section of said cable attached to a respective jaw and extending through an elongated receiving channel formed in said jaw and disposed between said jaw face and said hole of each jaw in substantially transverse orientation to the longitudinal axis of said jaw, the proximal end of said cable shield attached to said carriage such that movement of a distal end of said bifurcated cable with respect to said cable shield causes movement of said pair of jaws relative to said biasing force and into and out of engagement with said surface of said elongated member.

* * * * *